United States Patent
Jensen et al.

(10) Patent No.: US 9,176,024 B2
(45) Date of Patent: Nov. 3, 2015

(54) SYSTEMS AND METHODS FOR MONITORING ROTARY EQUIPMENT

(71) Applicant: General Electric Company, Schenectady, NY (US)

(72) Inventors: Raymond Verle Jensen, Gardnerville, NV (US); Charles Terrance Hatch, Gardnerville, NV (US); Sean Kelly Summers, Carson City, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/061,650

(22) Filed: Oct. 23, 2013

(65) Prior Publication Data

US 2015/0107342 A1  Apr. 23, 2015

(51) Int. Cl.
| | |
|---|---|
| *G01M 15/14* | (2006.01) |
| *G01L 3/12* | (2006.01) |
| *G01L 3/10* | (2006.01) |
| *G01L 3/14* | (2006.01) |
| *G01M 1/16* | (2006.01) |
| *G01P 3/49* | (2006.01) |

(52) U.S. Cl.
CPC ........... *G01M 15/14* (2013.01); *G01L 3/101* (2013.01); *G01L 3/109* (2013.01); *G01L 3/12* (2013.01); *G01L 3/1435* (2013.01); *G01M 1/16* (2013.01); *G01P 3/49* (2013.01)

(58) Field of Classification Search
CPC ........... G01L 3/12; G01L 3/109; G01L 3/101; G01L 3/104; G01L 3/1435; G01M 1/16; G01M 15/14; G01P 3/49

USPC ........................................ 73/112.01, 862.321
See application file for complete search history.

(56) References Cited

U.S. PATENT DOCUMENTS

| | | | | |
|---|---|---|---|---|
| 5,038,616 | A | * | 8/1991 | Schneider et al. ............... 73/660 |
| 5,067,355 | A | * | 11/1991 | Witte ....................... 73/862.326 |
| 5,137,128 | A | | 8/1992 | Takei et al. |
| 5,200,698 | A | | 4/1993 | Thibaud |
| 5,265,480 | A | * | 11/1993 | Tsuji et al. ............... 73/862.325 |
| 5,438,882 | A | * | 8/1995 | Karim-Panahi et al. .. 73/862.324 |
| 5,675,095 | A | * | 10/1997 | Ballantyne ............... 73/862.325 |
| 5,734,108 | A | * | 3/1998 | Walker et al. .................. 73/650 |
| 5,918,286 | A | * | 6/1999 | Smith et al. ............. 73/862.324 |
| 6,213,846 | B1 | * | 4/2001 | Li et al. ............................ 451/6 |
| 6,405,696 | B1 | | 6/2002 | Borraccia et al. |

(Continued)

FOREIGN PATENT DOCUMENTS

| | | |
|---|---|---|
| FR | 2664691 A1 | 1/1992 |
| JP | H-02-83412 A | 3/1990 |
| KR | 10-2008-0098131 A | 11/2008 |

OTHER PUBLICATIONS

Search Report in Denmark Patent Application No. PA 2014 70646 dated Sep. 9, 2015.

*Primary Examiner* — Freddie Kirkland, III
(74) *Attorney, Agent, or Firm* — Fletcher Yoder P.C.

(57) ABSTRACT

A system includes a first unitary measurement strip configured to be secured about a rotational component at a first axial location. The first unitary measurement strip includes a first set of one or more windows, each window of the first set of one or more windows is configured to correspond to a first respective tangential location of the rotational component at the first axial location, and each window of the first set of one or more windows is configured to be detectable via a first sensor.

23 Claims, 4 Drawing Sheets

(56) References Cited

U.S. PATENT DOCUMENTS

| | | | |
|---|---|---|---|
| 6,450,044 B1* | 9/2002 | Eisenhauer et al. | 73/862.193 |
| 7,104,133 B2* | 9/2006 | Kuroda et al. | 73/650 |
| 7,305,949 B2 | 12/2007 | McCarthy et al. | |
| 7,322,250 B1* | 1/2008 | Discenzo | 73/800 |
| 7,559,258 B2* | 7/2009 | Matzoll et al. | 73/862.08 |
| 8,042,412 B2* | 10/2011 | Xia et al. | 73/862.324 |
| 2004/0050178 A1* | 3/2004 | Parkinson | 73/862.328 |
| 2006/0279279 A1 | 12/2006 | Foley | |
| 2007/0056387 A1* | 3/2007 | Obikawa | 73/862.324 |
| 2007/0113680 A1* | 5/2007 | Matzoll et al. | 73/862.08 |
| 2009/0320609 A1* | 12/2009 | Xia et al. | 73/862.08 |
| 2011/0015878 A1* | 1/2011 | LaVigne et al. | 702/41 |
| 2011/0101964 A1 | 5/2011 | Ausserlechner et al. | |
| 2011/0267045 A1 | 11/2011 | Baller et al. | |
| 2013/0160568 A1 | 6/2013 | Voss et al. | |
| 2013/0160669 A1 | 6/2013 | Turmeau et al. | |

* cited by examiner

SYSTEMS AND METHODS FOR MONITORING ROTARY EQUIPMENT

BACKGROUND

The subject matter disclosed herein relates to systems and methods for monitoring rotation of components in rotary equipment.

Rotary equipment, such as turbomachinery, has one or more rotating components, such as a shaft, a rotor, an impeller, compressor blades, turbine blades, or wheels. The operational parameters of the rotating components may be described by one or parameters, such as rotational speed and torque. Unfortunately, complex machinery such as gas turbine engines may complicate the use of monitoring equipment due to the size, complexity, and precision of rotating components. Therefore, it may be desirable to improve the monitoring of rotating components while reducing the cost, size, load, stress, and overall impact of the monitoring equipment on the rotating components.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first unitary measurement strip configured to be secured about a rotational component at a first axial location. The first unitary measurement strip includes a first set of one or more windows, each window of the first set of one or more windows is configured to correspond to a first respective tangential location of the rotational component at the first axial location, and each window of the first set of one or more windows is configured to be detectable via a first sensor.

In a second embodiment, a system includes a first unitary measurement strip configured to be secured about a rotational component at a first axial location, wherein the first unitary measurement strip includes a first set of one or more windows, and each window of the first set of one or more windows is configured to correspond to a first respective tangential location of the rotational component at the first axial location. The system also includes a first sensor configured to transmit first operational feedback based at least in part on when the first rotational sensor detects each window of the first set of one or more windows from a radial direction. The system also includes a controller coupled to the first sensor and configured to determine an operational parameter of the rotational component based at least in part on the first operational feedback.

In a third embodiment, a method includes determining an operational parameter of a rotational component with a first unitary measurement strip secured about the rotational component at a first axial location. The first unitary measurement strip includes a first set of one or more windows, each window of the first set of one or more windows is configured to correspond to a first respective tangential location of the rotational component at the first axial location, and each window of the first set of one or more windows is configured to be radially detectable via a first sensor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Sensors of a monitoring system provide feedback to a controller (e.g., a processor-based industrial controller) to determine operational parameters (e.g., rotational parameters, environmental parameters) of rotating components. For example, the rotating components may include shafts, rotors, wheels, impellers, or rotary blades (e.g., compressor or turbine) of rotary machines, such as turbines, compressors, pumps, generators, motors, or various turbomachinery. One or more windows detectable by a sensor of the monitoring system are disposed about a rotating component. Each sensor provides feedback to the controller when the respective sensor senses a window (e.g., when the window traverses the sensor). As the rotating component rotates about an axis, the controller determines operational parameters (e.g., rotational parameters) based at least in part on the received feedback over a time period. In some embodiments, the rotational parameters that the controller may determine include, but are not limited to, rotational speed, non-rotation, differential (e.g., thermal) expansion and contraction, changes in rotational direction, changes in speed, torque, angle of twist, changes in torque, torsional vibration, or any combination thereof.

The controller may determine the operational parameters (e.g., rotational parameters, environmental parameters) by observing the frequency at which one or more windows is sensed by the monitoring system. The embodiments discussed herein utilize one or more measurement strips secured to a rotary component. The measurement strips may reduce costs, weight, manufacturing complexity, installation complexity, stress, and/or balance issues associated with other techniques, such as machined shafts, machined wheels, or machined split wheels.

A measurement strip with the one or more windows as described herein may be formed from a flexible sheet by laser cutting, water jet cutting, stamping, machining, plasma cutting, or another removal process. In some embodiments, the measurement strip and/or the one or more windows of the measurement strip may be formed from an additive process, such as welding, brazing, application of an adhesive, layered deposition (e.g., 3D printing), or any combination thereof. The measurement strip may be secured to the rotating component (e.g., shaft) at an axial location, such that the one or more windows correspond to respective tangential locations on the rotating component (e.g., shaft). Measurement strips as described herein secure the one or more windows to the rotating component (e.g., shaft) with a reduced effect on the rotordynamic response as compared with machined wheels. The measurement strip may be a unitary component that may be arranged about the rotating component (e.g., shaft) from a radial direction. Radial installation of the unitary measurement strip enables the one or more windows to be arranged about a rotating component (e.g., shaft) of an assembled rotational system with limited access to the shaft.

Figure 1:
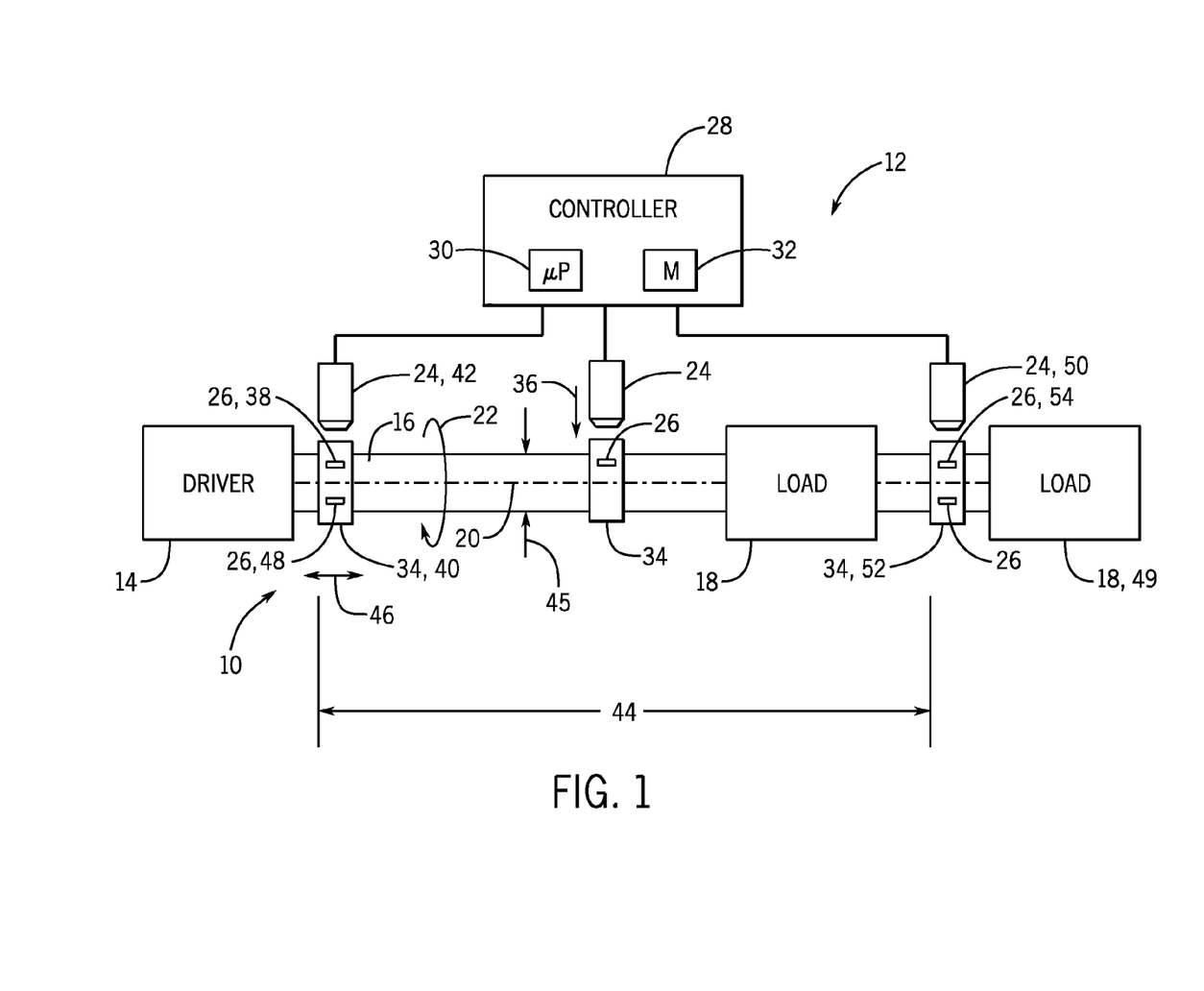
FIG. 1 is a schematic diagram illustrating an embodiment of a monitoring system, in accordance with aspects of the present disclosure.

Turning to the drawings, FIG. 1 is a schematic diagram that illustrates an embodiment of a rotational system 10 (e.g., rotary machinery such as turbomachinery) and a rotational monitoring system 12. In the rotational system 10, a driver 14 rotates a shaft 16 coupled to one or more loads 18. The driver 14 may include, but is not limited to, a gas turbine, a steam turbine, a wind turbine, a hydro turbine, a reciprocating engine (e.g., diesel, gasoline, pneumatic), an electric motor, or any combination thereof. The driver 14 provides a rotational output via the shaft 16 to the one or more loads 18, each of which may include, but is not limited to, a vehicle or a stationary load. In some embodiments, the one or more loads 18 may include a propeller on an aircraft, an electrical generator in a power plant, a compressor, a pump, a fan, a machine, any suitable device capable of being powered by the rotational output of driver 14, or any combination thereof. The shaft 16 rotates along an axis 20. In some embodiments, the rotational system 10 includes multiple shafts coupled to one another. Each shaft 16 rotates along a respective axis 20 as shown by arrow 22.

The monitoring system 12 monitors the rotational system 10 and determines one or more operational parameters of components (e.g., driver 14, shaft 16, load 18) of the rotational system 10. Operational parameters may include rotational parameters, such as rotational speed, non-rotation, axial or radial expansion, axial or radial contraction, changes in rotational direction, changes in speed, torque, angle of twist, changes in torque, torsional vibration, or any combination thereof. Operational parameters may also include environmental parameters, such as differential expansion (e.g., thermal expansion and thermal contraction). One or more sensors 24 arranged along the rotational system 10 sense one or more windows 26 arranged at specific locations (e.g., tangential or circumferential locations relative to a reference angle) of the rotational system 10. For example, the windows 26 may be circumferentially spaced at different angular positions or spacings circumferentially about the axis 20. Each sensor 24 transmits feedback to a controller 28 based at least in part on when the respective sensor 24 senses a window 26 as the windows 26 rotate about the axis 20. In some embodiments, multiple sensors 24 may be arranged at an axial position to monitor one set of windows 26. For example, sensors 24 may be arranged on opposite sides or orthogonal sides of a rotational component (e.g., shaft 16), thereby enabling the monitoring system 12 to reduce or eliminate timing distortions due to radial vibration of the rotational component.

A processor 30 of the controller 28 determines one or more operational parameters from the received feedback. The controller 28 may store received feedback and/or instructions or code for processing the received feedback in a non-transitory machine-readable medium 32, such as memory. The non-transitory machine-readable medium 32 (e.g., memory) does not include transitory signals, and may be volatile memory or non-volatile memory. In some embodiments, the non-transitory machine-readable medium 32 may include, but is not limited to, random access memory (RAM), read-only memory (ROM), flash memory, a hard drive, or any other optical, magnetic, and/or solid-state storage media, or some combination thereof. In some embodiments, the controller 28 may include a workstation, a laptop, a mobile device, or a tablet.

Each of the one or more windows 26 is arranged on a measurement strip 34 (e.g., an annular measurement strip 34), which is secured about a rotating component (e.g., driver 14, shaft 16, load 18) of the rotational system 10. As discussed in detail below, the one or more windows 26 include, but are not limited to, recesses fully or partially through the measurement strip 34, raised portions of the measurement strip 34, or differently textured portions of the measurement strip 34, or any combination thereof. In some embodiments, the measurement strip 34 may have one or more layers, and a layer within the measurement strip 34 may have voids and/or inserts. The voids and/or inserts may have different characteristics (e.g., electrical conductivity, magnetic reluctance) relative to other layers or portions of the measurement strip 34. The one or more sensors 24 may sense the voids and/or inserts as windows 26. The one or more windows 26 are arranged to be detectable from a radial direction 36 by the one or more sensors 24. For example, each of the one or more sensors 24 may include an eddy current sensor, a capacitance sensor, a magnetic reluctance sensor, a contact sensor, or a displacement sensor, or any combination thereof. During operation, one or more of the windows 26 may become partially obstructed with debris (e.g., lubricant, dust, particulates). Accordingly, a non-optical sensor 24 (e.g., eddy current sensor, capacitance sensor, magnetic reluctance sensor) may sense the one or more partially obstructed windows 26 despite the debris.

The monitoring system 12 may determine one or more operational parameters of a rotational component (e.g., driver 14, shaft 16, load 18) with one or more secured measurement strips 34 utilizing feedback received from the one or more sensors 24. The monitoring system 12 may determine the rotational speed (e.g., rotations per minute (RPM)) or a non-rotation condition of a rotational component (e.g., shaft 16) via observing the frequency at which a first window 38 on a first measurement strip 40 is sensed during an observation period. In some embodiments, the monitoring system 12 may determine the thermal expansion or thermal contraction of the shaft 16 based at least in part on sensing the first window 38 with a first sensor 42. For example, the monitoring system 12 may determine a change in a length 44 of the shaft 16 via detection by the first sensor 42 of a change in an axial direction 46 of the first window 38. In some embodiments, the monitoring system 12 may determine a change in a diameter 45 of the shaft 16 via monitoring the shaft 16 or one or more windows 26 on the shaft 16 (e.g., monitoring a distance to the shaft 16).

The monitoring system 12 may determine reverse rotation and changes in the rotational speed via observing the frequency and/or sequence at which multiple windows 26 of the first measurement strip 40 are sensed during an observation period. For example, a second window 48 on the first measurement strip 40 may have a different geometry and/or orientation than the first window 38. The controller 28 may determine the rotational direction based at least in part on the sequence the first sensor 42 senses the first and second windows 38, 48. Additionally, the controller 28 may determine the rotational speed of the shaft 16 multiple times per revolution of the shaft 16 based at least in part on feedback corresponding to the first and second windows 38, 48. For example, the controller 28 may determine the rotational speed of the shaft 16 utilizing frequency of observing the first window 38, frequency of observing the second window 48, and/or elapsed time between observations of the first window 38 and the second window 48.

In some embodiments, the monitoring system 12 may include multiple measurement strips 34, each measurement strip 34 having one or more windows 26. The monitoring system 12 may determine rotational conditions such as torque and torsional vibration based at least in part on feedback corresponding to windows 26 on different measurement strips. Torque on the shaft 16 during operation of the rotational system 10 may twist the shaft 16 about the axis 20 between the driver 14 and a first load 49. As discussed in detail below, the controller 28 may utilize feedback from the first sensor 42 sensing the first measurement strip 40 and from a second sensor 50 sensing a second measurement strip 52 to determine the torque on the shaft 16 and/or torsional vibration of the shaft 16. In some embodiments, windows 26 at different axial locations are aligned tangentially, thereby enabling the monitoring system 12 to observe the aligned windows substantially simultaneously when the rotating component is not twisted about the axis 20. The controller 28 may determine the torque based at least in part on a relative timing change in receiving feedback corresponding to the first window 38 on the first measurement strip 40 and feedback corresponding to a third window 54 on the second measurement strip 52. Where the rotational system 10 includes multiple loads 18, multiple sensors 24 and measurement strips 34 may be arranged to enable the monitoring system 12 to determine the torque and/or torsional vibration on the shaft 16 from each load 18. The controller 28 may determine torsional vibration on the rotary component (e.g., shaft 16) via monitoring trends (e.g., frequency of observing one more windows 26) over multiple revolutions of the rotary component.

Figure 2:
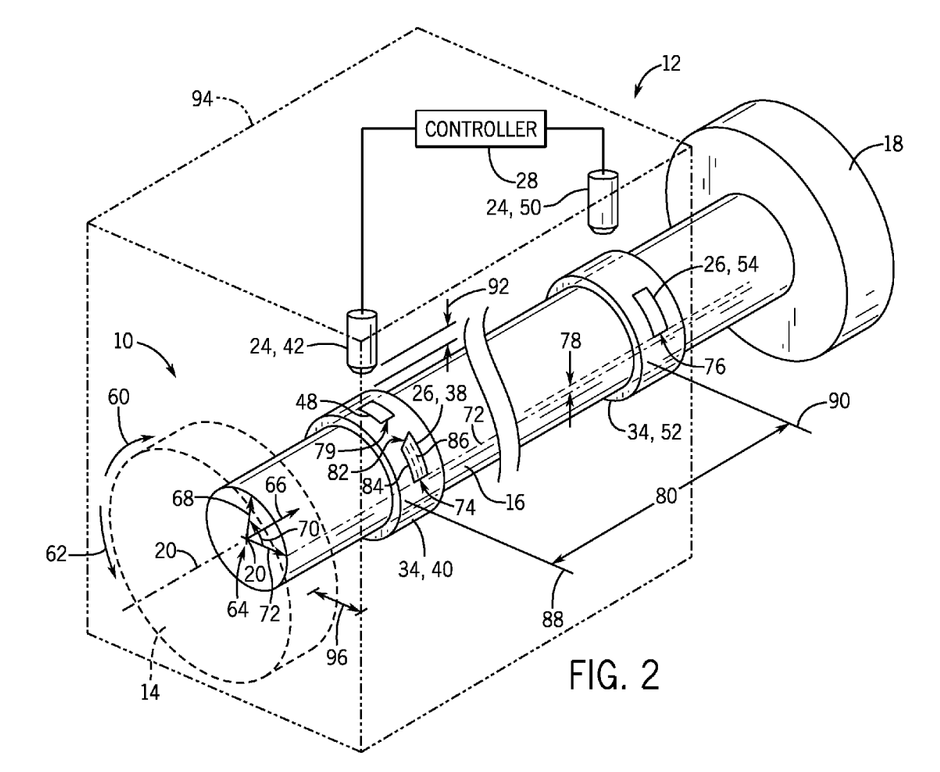
FIG. 2 is a perspective view of an embodiment of the monitoring system with measurement strips about a shaft.

FIG. 2 illustrates a perspective view of an embodiment of the rotational system 10 with the rotational monitoring system 12. The driver 14 rotates the shaft 16 and the load 18 about the axis 20 in a first tangential direction 60 and/or a second tangential direction 62. Cylindrical-polar coordinate axes 64 depicts the longitudinal (e.g., axial) axis 66 along the axis 20, a radial axis 68, and an angular (e.g., tangential) component 70 relative to a reference angle 72. The first measurement strip 40 may be secured to the shaft 16 such that the first window 38 is aligned with the reference angle 72. In some embodiments, the monitoring system 12 may relate a first edge 74 of the first window 38 to a zero-orientation (e.g., 0°) of the shaft 16. The third window 54 on the second measurement strip 52 may also be aligned with the reference angle 72 (e.g., tangential location). That is, each window 26 may be aligned with a corresponding tangential location of the rotating component when the rotating component is at rest (e.g., substantially no torque on shaft 16). For example, a second edge 76 of the third window 54 may be aligned with the reference angle 72 when the shaft 16 is not rotating. Upon rotation of the shaft 16, the torque on the shaft 16 between the driver 14 and the load 18 may twist the shaft 16. The torque on the shaft 16 may displace the second edge 76 by an arc distance 78 relative to the first edge 74 and the reference angle 72. The controller 28 may determine the angle of twist from the arc distance 78, and the controller 28 may determine the torque on the shaft 16 based at least in part on the arc distance 78, a distance 80 between the first window 38 and the third window 54, a material of the shaft 16, and a structure (e.g., solid, hollow, circular, square) of the shaft 16. In some embodiments, the controller 28 may determine the rotational parameter (e.g., torque) utilizing look-up tables, graphs, equations, computer models, trend data, historical data, or fleet data, or any combination thereof.

The controller 28 may determine torsional vibration on the shaft 16 by comparison of the feedback received from the first sensor 42 to the feedback received from the second sensor 50. As may be appreciated, the first sensor 42 may detect the first edge 74 at a first time ($T_1$), and the second sensor 50 may detect the second edge 76 at a second time ($T_2$). Changes in torque on the shaft 16 may result in differences between $T_1$ and $T_2$ while the rotational speed changes. The controller 28 may determine the arc distance 78 and/or the angle of twist between the first measurement strip 40 and the second measurement strip 52 from the differences between $T_1$ and $T_2$. In some embodiments, the first sensor 42 may detect a third edge 79 of the second window 48 at a third time ($T_3$). Differences between $T_1$ and $T_3$ (e.g., $\Delta T$) during operation of the rotational system 10 may identify a torsional vibration rotational parameter. The controller 28 may determine a magnitude and/or a source of the torsional vibration by evaluating changes to $\Delta T$ over a time period (e.g., 0.1 seconds, 0.5 seconds, 1 second, 5 seconds, 10 seconds, or more) or a quantity of revolutions of the rotary component. For example, the controller 28 may compare patterns in the $\Delta T$ over the time period to events affecting the driver 14 and/or the load 18 to identify a source of the torsional vibration. Events may include, but are not limited to, rotation of other components of the rotational system 10, driver events (e.g., misfiring of cylinder of reciprocating engine), or load events. In some embodiments, the torsional vibration determined at the first measurement strip 40 may be compared to torsional vibration determined in a similar manner at the second measurement strip 52. The comparison may enable the controller 28 to determine the shape of the torsional vibration mode shape of the shaft 16.

Embodiments with multiple windows 26 on each measurement strip 34 may enable the monitoring system 12 to determine rotational parameters (e.g., the torque and/or torsional vibration) with more precision and/or more accuracy than embodiments with only a first window 38 and a third window 54. Additionally, multiple windows 26 increase the available feedback to the monitoring system 12, thereby enabling the monitoring system 12 to identify operational parameters more quickly than with fewer windows 26, and to identify changes to an operational parameter within one revolution of the rotational component (e.g., shaft 16). As may be appreciated, the bandwidth of the torsional vibration measurement (e.g., the maximum measurable frequency) and/or the bandwidth of the rotational speed measurement may be functionally related to the quantity of windows 26 of the measurement strip 34. For example, increasing the quantity of windows 26 on a measurement strip 34 may increase the maximum measurable frequencies for the torsional vibration and the rotational speed. In some embodiments, the monitoring system 12 may monitor rotational systems 10 with rotational speeds less than approximately 10,000 RPM, 7,500 RPM, 4,000 RPM, 2,000 RPM, 1,000 RPM, or 100 RPM.

In some embodiments, the first window 38 has a second edge 82 that is oblique relative to the first edge 74 and the axis 20. As may be appreciated, the shaft 16 may expand axially as the temperature of the shaft 16 increases, and contract axially as the temperature of the shaft 16 decreases. When the shaft 16 is at a first temperature (e.g., 20 degrees C.), the first sensor 42 senses a first arc 84 length between the first edge 74 and the second edge 82. When the shaft 16 is at a second temperature (e.g., 50 degrees C.), the first sensor 42 senses a second arc length 86 between the first edge 74 and the second edge 82. The first measurement strip 40 is secured to the shaft 16 at a first axial location 88 along the shaft 16, and the second measurement strip 52 is secured to the shaft 16 at a second axial location 90. Based at least in part on the detection of the first window 38, the controller 28 may determine a length of the shaft 16 and/or the distance 80 between the first and second axial locations 88, 90. Additionally, or in the alternative, the controller 28 may determine changes to a length of the shaft 16 and/or the distance 80 due to torque on the shaft 16.

In some embodiments, the sensors 24 sense a distance 92 between the sensor 24 and the measurement strip 34. As may be appreciated, the shaft 16 may expand and contract in the radial direction 68 with temperature or torque variations on the shaft 16. The distance 92 may correspond to a radial clearance 96 between a portion (e.g., driver 14) of the rotational system 10 and a housing 94 about the rotational system 10. The one or more measurement strips 34 and corresponding sensors 24 may be arranged internally within the housing 94, externally outside the housing 94, or any combination thereof. Based at least in part on a signal from the sensor 24, the controller 28 may determine the distance 92 between the sensor 24 and the shaft 16 and the radial clearance 96 between the rotational system 10 and the housing 94. The one or more sensors 24 may be disposed on the housing 94, and the one or more measurement strips 34 are arranged on the rotational component (e.g., shaft 16). In some embodiments, the temperature of the rotational component may change at a different rate than the temperature of the housing 94, which may cause differential expansion or differential contraction between the rotational component and the housing 94. For example, at a start-up of a steam turbine, the housing 94 and the shaft 16 may be at approximately the same temperature. During start-up of the steam turbine, the shaft 16 may warm more quickly and expand at a greater rate than the housing 94, thereby reducing the radial clearance 96. The controller 28 may utilize signals from the one or more sensors 24 on the housing 94 to determine the radial clearance 96. In some embodiments, the controller 28 may control the operation of the rotational system to maintain the radial clearance 96 within a desired range.

Figure 3:
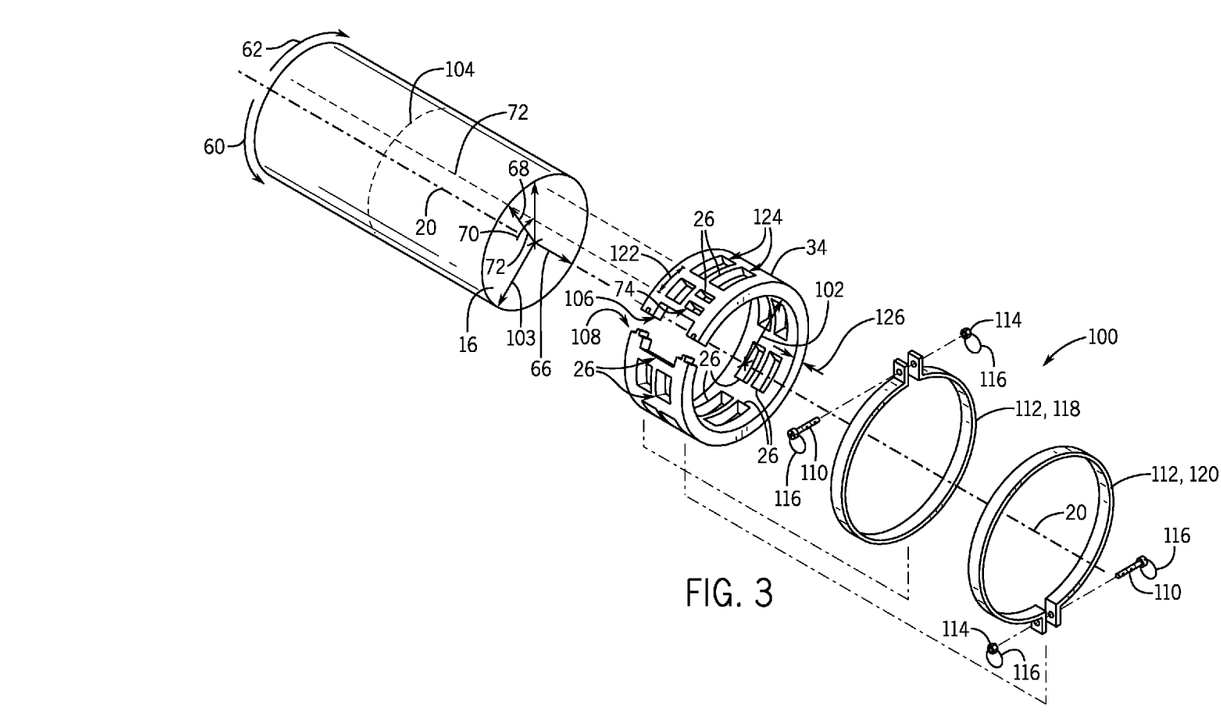
FIG. 3 is an assembly view of an embodiment of the monitoring system with bands to secure the measurement strip to the shaft.

In some embodiments, a measurement strip 34 may have multiple windows 26. FIG. 3 illustrates an assembly view of an embodiment of the measurement strip 34 with multiple windows 26 and a securing mechanism 100 configured to secure the measurement strip to the rotating component (e.g., shaft 16). The measurement strip 34 may be a unitary component, that is, a component formed from substantially one material, such as a metal or an electrically conductive material. In some embodiments, the measurement strip 34 includes at least a portion (e.g., one or more windows 26) that is electrically conductive and/or magnetically reluctant. For example, the measurement strip 34 may be a flexible planar strip of material (e.g., steel, aluminum, metal-coated plastic) that may be shaped or formed around the rotating component (e.g., resiliently bent or turned around the shaft 16 to conform to the structure of the shaft 16). In some embodiments, the measurement strip 34 is a planar sheet, a split ring, or a C-ring that enables the measurement strip 34 to be arranged about the shaft 16 from a radial direction 68. For example, the measurement strip 34 may be a thin, flexible strip that may be opened for installation about the shaft 16, then closed and secured about the shaft 16 as discussed below. Additionally, or in the alternative, the measurement strip 34 may be assembled about the shaft 16 from the axial direction 66, and thus may be a single annular ring (e.g., one-piece continuous ring or partial ring). In some embodiments, an inner radius 102 of the measurement strip 34 is approximately equal to an outer radius 103 of the shaft 16 at the axial location 104 where the measurement strip 34 is to be secured.

The measurement strip 34 is a separate component from the rotary component (e.g., shaft 16) that may be removably or fixedly secured to the rotary component (e.g., shaft 16). In some embodiments, the measurement strip 34 is disposed about substantially all (e.g., greater than 270°) of the shaft 16 at the axial location 104. A first end 106 of the measurement strip 34 may interface with a second end 108 of the measurement strip 34 when the measurement strip 34 is secured about the shaft 16. For example, the first end 106 may mate with the second end 108. In some embodiments, the securing mechanism 100 to secure the measurement strip 34 about the shaft is a bond between the first end 106 and the second end 108. For example, the securing mechanism 100 may include, but is not limited to a weld, a braze, an adhesive, an interference fit via heat treatment, or any combination thereof. In some embodiments, the first and second ends 106, 108 may accommodate a fastener 110 (e.g., screw, bolt, snap, clasp, hook) to secure the measurement strip 34 about the shaft 16.

Additionally, or in the alternative, one or more bands 112 may secure the measurement strip 34 about the shaft 16. Each band 112 may be tightened about the measurement strip 34 and the shaft 16, thereby securing the measurement strip 34 at the axial location 104. Each band 112 may include a fastener 110 (e.g., screw, bolt, clip, button) to close the band 112 about the measurement strip 34. In some embodiments, a nut 114 couples with the fastener 110 to tighten the band 112 about the measurement strip 34. The fasteners 110, the nuts 114, and/or the bands 112 may have tethers 116 to secure the connection with the shaft 16 should the fastener 110, the nut 114, or the band 112 become loose within the rotational system 10. In some embodiments, a weld, a braze, an adhesive, or other securing mechanism 100 may secure a band 112 about the measurement strip 34. The bands 112 may be arranged about the measurement strip 34 to reduce any effect on the rotordynamic response. For example, a first band 118 and a second band 120 may be arranged such that the fastener 110 for the first band 118 is on an opposite side of the shaft 16 than the fastener 110 for the second band 120, as shown in FIG. 3.

The bands 112 may be arranged to secure the measurement strip 34 such that the windows 26 are detectable from the radial direction 68. As discussed above, the first window 38 is to be secured about the shaft 16 such that the first edge 74 corresponds to a reference angle 72 (e.g., 0°). In some embodiments, the first window 38 may be different from the other windows 26, such as having a sub-window, to identify the first window 38 among the other windows 26. Each of the other windows 26 may be spaced apart from the first window 38 by a defined arc distance 122 and/or angle 70. In some embodiments, the spacing between the windows 26 may be uniform. For example, the measurement strip 34 illustrated in FIG. 3 has eight sets of windows 26 spaced 45° apart. Presently contemplated embodiments may include, but are not limited to, windows 26 spaced apart by approximately 5°, 10°, 15°, 20°, 30°, 40°, 50°, 60°, 90°, or more, or any combination of such spacings. Accordingly, the monitoring system 12 may determine some operational parameters (e.g., speed, angular position) at least eight times per revolution of the shaft 16. Additionally, or in the alternative, the spacing between the windows 26 may be non-uniform. For example, the spacing between sequential windows 26 may increase by approximately 2.5 mm (e.g., approximately 0.1 inch) in a sequence: 15.2 mm, 17.8 mm, 20.3 mm, 22.9 mm, 25.4 mm (e.g., 0.6 in, 0.7 in, 0.8 in, 0.9 in, 1.0 in). The monitoring system 12 may correlate increasing spacings with the first tangential direction 60, and may correlate decreasing spacings with the second tangential direction 62. The measurement strip 34 may have multiple rows 124 of windows 26 (e.g., rows of circumferentially spaced windows 26, wherein the rows 124 are axially spaced apart from one another).

Some embodiments of the measurement strip 34 may be formed from sheet metal or another relatively thin material with respect to the radius 103 of the shaft 16. For example, a thickness 126 of the measurement strip 34 may be less than 1, 2, 3, 4, 5, 6, 7, 8, 9, or 10% of the radius 103 of the rotating component. In some embodiments, a thickness 126 of the measurement strip 34 may be less than approximately 19 mm, 12.7 mm, 6.4 mm, 3.2 mm, 1.6 mm, 0.4 mm, or less (e.g., approximately 0.75 in, 0.5 in, 0.25 in, 0.125 in, 1/16 in, 1/64 in, or less). The mass of the measurement strip 34 may be an insignificant contribution to the mass and the inertia of the rotational system 10 or the rotation component (e.g., shaft 16) to which the measurement strip 34 is secured. For example, the mass of the measurement strip 34 may be less than 0.01, 0.1, 1, 2, 3, 4, 5, 6, 7, 8, 9, or 10% of the mass of the rotational system 10 or the rotating component (e.g., shaft 16) to which the measurement strip 34 is secured. Accordingly, the mass of the measurement strip 34 may have a substantially negligible effect on the rotordynamic response of the rotational system 10.

Figure 4:
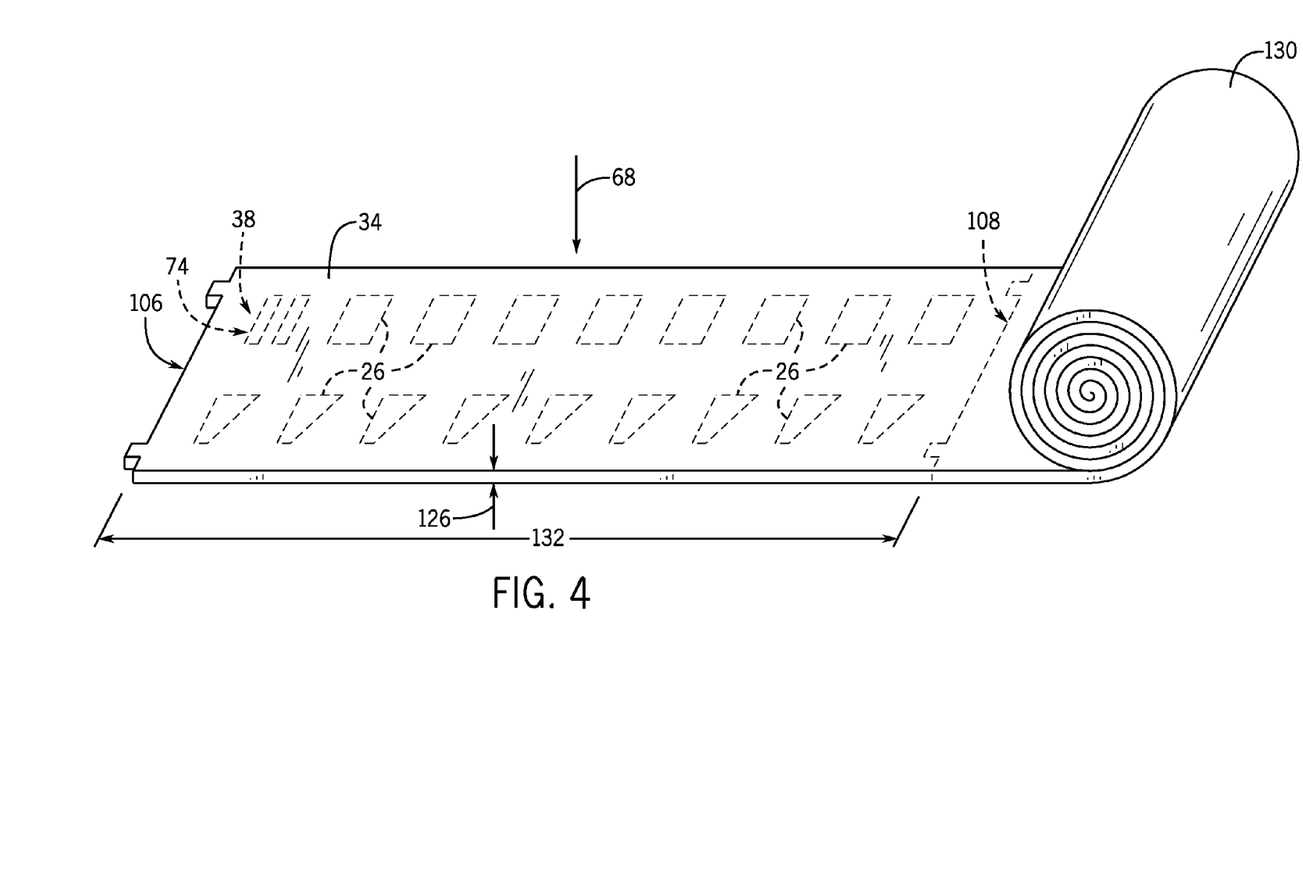
FIG. 4 is a perspective view of an embodiment of the formation of a measurement strip.

FIG. 4 illustrates an embodiment of the formation of the measurement strip 34. In some embodiments, the measurement strip 34 is formed from a sheet 130 (e.g., rolled sheet) of a material, including, but not limited to, aluminum, steel, stainless steel, plastic, or any combination thereof. The measurement strip 34 may be cut from the sheet 130 via a plasma cutter, a water jet, a laser, or a machine tool (e.g., mill). In some embodiments, the measurement strip 34 is stamped from the sheet 130. The measurement strip 34 may be formed so that a strip length 132 is approximately equal to a circumference of the rotating component (e.g., driver 14, shaft 16, load 18) to which the strip 34 will be secured. The one or more windows 26, shown in FIG. 4 with dashed lines, may be formed on the measurement strip 34 by adding material to or removing material from the measurement strip 34. In some embodiments, the windows 26 may be recesses partially or fully through the thickness 126 of the measurement strip 34. The windows 26 may be formed via a plasma cutter, a water jet, a laser, a die (e.g., via a stamping process, or a machine tool (e.g., mill), or any combination thereof. As discussed above, the windows 26 may also include raised portions of the measurement strip 34, differently conductive portions of the measurement strip 34, or differently textured portions of the measurement strip 34, or any combination thereof. The windows 26 may have various geometries including, but not limited to dots, slits, circles, ellipses, triangles, quadrilaterals (e.g., squares, rectangles, parallelograms, trapezoids), pentagons, hexagons, or polygons, or any combination thereof. As described above, edges of the windows 26 may be parallel or oblique to the axis 20 upon installation about the rotary component. Upon removal of the measurement strip 34 from the sheet 130 and formation of the one or more windows 26, the measurement strip 34 may be shaped (e.g., curved) to approximately the form of the rotating component (e.g., annular-shaped measurement strip 34).

Technical effects of the invention include that the measurement strip 34 may be formed from one piece of material (e.g., rolled sheet 130) and may be secured to an axial location 104 of a rotating component from an axial or radial direction with minimal effect on the rotordynamic response of the rotating component due to the size and mass of the measurement strip 34. The unitary construction, size, and flexibility of the measurement strip 34 may enable a technician to install the measurement strip 34 with less time, less effort, and/or at a lower cost than installation of a split machined wheel or machined shaft of a rotational system. The technician may form the windows 26 on the measurement strip 34 to a desired tolerance level utilizing a variety of tools and processes for a lower cost than precision machining the shaft 16 and/or a machined split wheel with the same desired tolerance level. One or more measurement strips 34 as described herein may be utilized to determine one or more operational parameters of the rotational system, including, but not limited to rotational speed, non-rotation, differential expansion, changes in rotational direction, changes in speed, torque, changes in torque, torsional vibration, or any combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a first unitary measurement strip configured to be attached about a rotational component at a first axial location, the first unitary measurement strip having a first thickness, wherein the first unitary measurement strip comprises a first set of one or more windows formed in the first unitary measurement strip prior to attachment to the rotational component, each window of the first set of one or more windows is configured to correspond to a first respective tangential location of the rotational component at the first axial location, wherein each window of the first set of windows comprises a recess through an entirety of the first thickness of the first unitary measurement strip, and each window of the first set of one or more windows is configured to be detectable via a first non-optical sensor.

2. The system of claim 1, wherein the first unitary measurement strip comprises a first length approximately equal to a circumference of the rotational component.

3. The system of claim 1, comprising one or more bands configured to secure the first unitary measurement strip about the rotational component, wherein each band of the one or more bands comprises a fastener.

4. The system of claim 1, wherein the first unitary measurement strip is configured to be attached about the rotational component at the first axial location via a weld, an adhesive material, or a brazed material, or any combination thereof.

5. The system of claim 1, wherein each window of the first set of one or more windows is spaced uniformly along the first unitary measurement strip.

6. The system of claim 1, wherein the first set of one or more windows are non-uniformly spaced along the first unitary measurement strip.

7. The system of claim 1, wherein the first set of one or more windows comprises a first window configured to identify a reference location of the rotational component, and the first window is different than other windows of the first set of one or more windows.

8. The system of claim 1, comprising a second unitary measurement strip configured to be attached about the rotational component at a second axial location, the second unitary measurement strip having a second thickness, wherein the second unitary measurement strip comprises a second set of one or more windows formed in the second unitary measurement strip prior to attachment to the rotational component, each window of the second set of one or more windows is configured to correspond to a second respective tangential location of the rotational component at the second axial location, wherein each window of the second set of windows comprises a recess through an entirety of the second thickness of the second unitary measurement strip, and the second set of one or more windows is configured to be detectable via a non-optical second sensor.

9. The system of claim 1, comprising the first non-optical sensor, wherein the first non-optical sensor comprises an eddy current sensor, a capacitance sensor, a magnetic reluctance sensor, or any combination thereof.

10. The system of claim 1, wherein the first set of one or more windows comprises a first window that is oblique to an axis of the rotational component.

11. The system of claim 1, wherein the first unitary measurement strip comprises sheet metal, and the first thickness of the first unitary measurement strip is $1/16$ inches or less.

12. A system comprising:
a first unitary measurement strip configured to be attached about a rotational component at a first axial location, the first unitary measurement strip having a first thickness, wherein the first unitary measurement strip comprises a first set of one or more windows formed in the first unitary measurement strip prior to attachment to the rotational component, and each window of the first set of one or more windows is configured to correspond to a first respective tangential location of the rotational component at the first axial location, wherein each window of the first set of windows comprises a recess through an entirety of the first thickness of the first unitary measurement strip;
a first non-optical sensor configured to transmit first operational feedback based at least in part on when the first non-optical sensor detects each window of the first set of one or more windows from a radial direction; and
a controller coupled to the first non-optical sensor and configured to determine an operational parameter of the rotational component based at least in part on the first operational feedback.

13. The system of claim 12, wherein the operational parameter comprises a rotational direction, a rotational speed, a differential expansion, a torsional vibration, or any combination thereof.

14. The system of claim 12, wherein the first set of one or more windows comprises a first window that is oblique to an axis of the rotational component, and the controller is configured to determine differential expansion of the rotational component based at least in part on first operational feedback corresponding to the first window.

15. The system of claim 12, wherein the first set of one or more windows comprises a first window and a second window, and the operational parameter comprises a change in rotational direction, a change in rotational speed, a change in differential expansion, a change in torsional vibration, or any combination thereof.

16. The system of claim 12, comprising:
a second unitary measurement strip configured to be attached about the rotational component at a second axial location, the second unitary measurement strip having a second thickness, wherein the second unitary measurement strip comprises a second set of one or more windows formed in the second unitary measurement strip prior to attachment to the rotational component, and each window of the second set of one or more windows is configured to correspond to a second respective tangential location of the rotational component at the second axial location, wherein each window of the second set of windows comprises a recess through an entirety of the second thickness of the second unitary measurement strip; and
a second non-optical sensor configured to transmit second operational feedback based at least in part on when the second non-optical sensor detects each window of the second set of one or more windows;
wherein the controller is coupled to the second non-optical sensor and is configured to determine the operational parameter of the rotational component based at least in part on the second operational feedback, wherein the operational parameter comprises an angle of twist on the rotational component between the first axial location and the second axial location, a torque on the rotational component between the first axial location and the second axial location, or any combination thereof.

17. The system of claim 12, comprising one or more bands configured to secure the first unitary measurement strip about the rotational component, wherein each band of the one or more bands comprises a fastener.

18. The system of claim 12, wherein the first non-optical sensor comprises an eddy current sensor, a capacitance sensor, a magnetic reluctance sensor, or any combination thereof.

19. The system of claim 12, wherein the first unitary measurement strip comprises sheet metal, and the first thickness of the first unitary measurement strip is $1/16$ inches or less.

20. The system of claim 12, wherein the first non-optical sensor is an eddy current sensor.

21. A method comprising:
determining an operational parameter of a rotational component with a first unitary measurement strip attached about the rotational component at a first axial location, the first unitary measurement strip having a first thickness, wherein the first unitary measurement strip comprises a first set of one or more windows formed in the first unitary measurement strip prior to attachment to the rotational component, each window of the first set of one or more windows is configured to correspond to a first respective tangential location of the rotational component at the first axial location, wherein each window of the first set of windows comprises a recess through an entirety of the first thickness of the first unitary measurement strip, and each window of the first set of one or more windows is configured to be radially detectable via a first non-optical sensor.

22. The method of claim 21, wherein the first set of one or more windows comprises a first window and a second window, and the operational parameter comprises a rotational direction, a rotational speed, a differential expansion, a torsional vibration, a change in rotational direction, a change in the rotational speed, a change in differential expansion, a change in torsional vibration, or any combination thereof.

23. The method of claim 21, comprising determining a torque between the first axial location and a second axial location on the rotational component or a torsional vibration between the first axial location and the second axial location, or an angle of twist on the rotational component between the first axial location and the second axial location with the first unitary measurement strip and a second unitary measurement strip, the second unitary measurement strip having a second thickness, wherein the second unitary measurement strip is attached about the rotational component at the second axial location, the second unitary measurement strip comprises a second set of one or more windows, each window of the second set of one or more windows is configured to correspond to a second respective tangential location of the rotational component at the second axial location, wherein each window of the second set of windows comprises a recess through an entirety of the second thickness of the unitary measurement strip, and each window of the second set of one or more windows is configured to be radially detectable via a second non-optical sensor.

\* \* \* \* \*